March 11, 1941.  F. N. GRANT  2,234,643

PIPE JOINT FOR CONCRETE PIPE

Filed Sept. 6, 1939

Inventor
FLOYD N. GRANT,
By
Attorney

Patented Mar. 11, 1941

2,234,643

UNITED STATES PATENT OFFICE 2,234,643

PIPE JOINT FOR CONCRETE PIPE

Floyd N. Grant, South Gate, Calif., assignor to American Concrete and Steel Pipe Company, a corporation of Delaware Application September 6, 1939, Serial No. 293,583

2 Claims. (Cl. 285—112)

This invention relates generally to pipe joints and particularly to pipe joint constructions employed in joining concrete pipe sections.

One type of joint which has been used for securing concrete pipe sections together embodies the use of a resilient packing or gasket between the bell and spigot ends of adjoining pipe sections, the packing being compressed into sealing engagement with the respective bell and spigot portions of the pipe sections to seal the joint, such as shown in United States Letters Patent No. 1,976,589, issued October 9, 1934. In order to provide a successful joint of this type it is essential that a smooth dense surface be provided in the region of the packing and in order to accomplish this it has usually been necessary to provide a metal lining both on the spigot portion of one pipe section and on the inner wall of the bell portion of the other pipe section in order to provide a sufficiently smooth and dense surface to provide a seal. In making centrifugally spun concrete pipe it is very difficult to cast the concrete behind the metal bell band due to the fact that the centrifugal force necessarily present in the spinning of the pipe forces the concrete outwardly and away from the outer surface of the bell, the water working toward the inner surface and tending to wash away cement from the bell band. As a result this type of pipe often leaks externally of the bell band and of the sealing gasket. In any poured or molded concrete pipe without metal end rings it is difficult to cast the bell and spigot into sufficient accuracy and smoothness to secure a tight water seal and to accurately locate and place the gasket under compression.

It is also true that the provision of a metal band both externally of the spigot end of the pipe and interiorly of the bell band increases the cost of construction. Further with the ordinary spigot and bell construction of concrete pipe it is necessary in digging the trench for the pipe to dig out the trench at such points as the joint occurs so that the pipe rests on the hollow of the trench and not on the joints.

In view of the disadvantages of the ordinary bell and spigot joint, it is a primary object of this invention to provide a pipe joint construction for joining concrete pipe sections which eliminates the necessity of providing a bell end of any particular construction on the end of one of the pipe sections. This is also an advantage in the casting of centrifugal pipes as it simplifies such operation and limits it to merely the production of sections having ends of the spigot type. It is also a particular object of this invention to provide a pipe joint construction embodying a resilient packing which is particularly suitable for use in conjunction with centrifugally spun concrete pipe.

It is a further object of this invention to provide a pipe joint construction which may be readily assembled and which is relatively cheaper than the ordinary joint of the same general type. It is also an object of this invention to provide a pipe joint construction which eliminates the necessity of providing a metal band or surface on the spigot ends of pipe sections against which a packing may be compressed in order to provide a seal of the joint.

These and other objects will be apparent from the drawing and the following description thereof. Referring to the drawing which is for illustrative purposes only—

Figure 1:
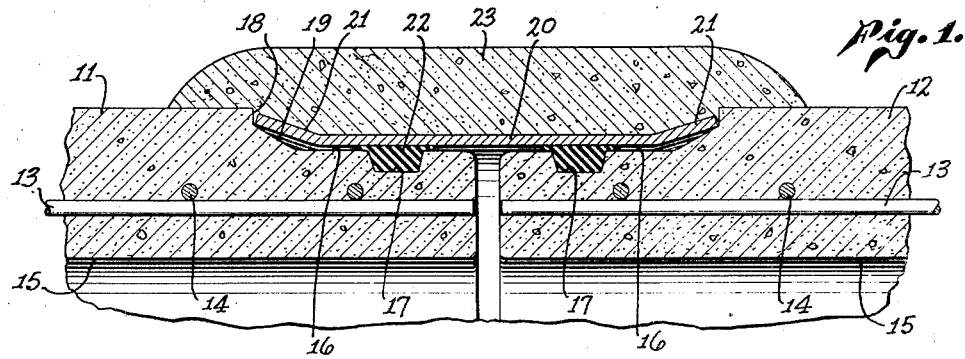
Fig. 1 is a fragmentary sectional elevation of a pipe joint embodying the construction of this invention.

More particularly describing the invention, reference numerals 11 and 12 indicate concrete pipe sections which are provided with longitudinal reinforcement members 13 and circular reinforcement members 14. Each pipe section is provided with the ordinary longitudinal fluid passage way 15. Although it is not intended to limit the invention to a joint for centrifugally spun pipe, the construction of the joint is particularly suitable for joining centrifugally spun pipe sections and for the purpose of description it will be assumed that the pipe sections 11 and 12 are of the type which have been cast by the centrifugally spun method. Each of the pipe sections is provided with a reduced end portion 16. The reduced end portion is substantially cylindrical in shape and is interrupted by an annular groove 17. The groove has been shown as provided with outwardly divergent side walls, however, this is not an essential part of the invention. Since the pipe sections 11 and 12 are assumed to have been made by the centrifugally spun method, the concrete, in the region of the reduced end portions 16 and grooves 17, is particularly smooth and dense. If the pipe sections are made by some other process care should be taken to insure the provision of a smooth dense surface in the region of the grooves 17.

Each of the pipe sections is also provided with an annular shoulder 18 and preferably with a frustro-conical portion 19 located between the shoulder 18 and reduced end portion 16. Adapted to cooperate with the two pipe sections is a band 20 which is preferably provided with flared end portions 21 as indicated on the drawing. Located in each groove is a packing ring or gasket 22 which may be formed of any resilient material such as rubber or the like. These packing rings are under compression between the respective pipe sections of the band 20 and thereby insure a liquid tight joint.

Figure 2:
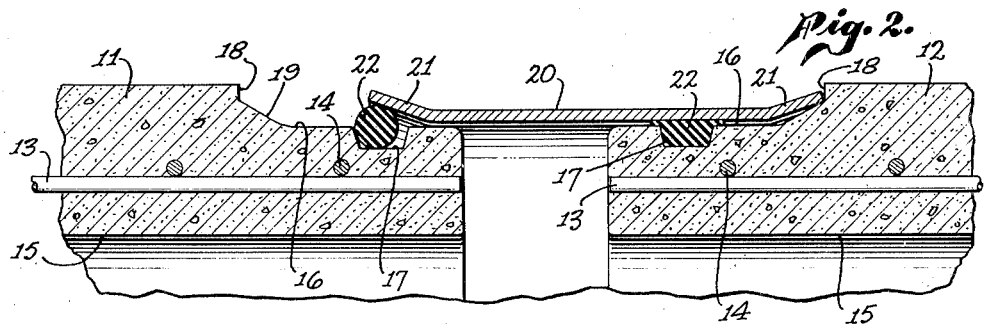
Fig. 2 is a view similar to Fig. 1 showing the parts in partially assembled relation.
Figure 3:
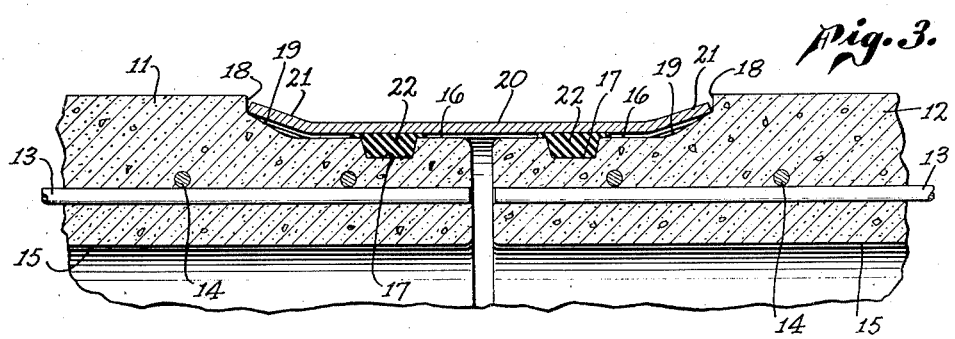
Fig. 3 is a view similar to Fig. 1 showing the pipe sections in assembled position prior to enclosing the joint by an encasement means.
Figure 4:
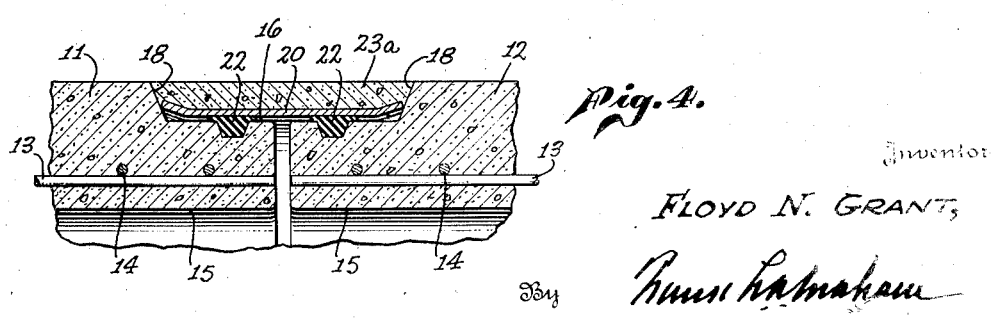
Fig. 4 is a fragmentary sectional elevation of a modified form of the invention.

By referring to Fig. 2 it will be apparent that during assembly of the joint each of the rings 22 are positioned in the grooves 17 in the manner of the ring 22 of the pipe section 11 and that the pipe sections are thrust or forced into the band 20. In this connection the flared end portions 21 of the band permit a gradual compression of the respective packing rings into their grooves to the position in which they are shown in Figs. 1 and 3. During assembly the surfaces 19 provide for the self-centering of the joint and when the pipe sections have been inserted in the band to the desired point the band abuts against the respective shoulders 18 insuring proper relationship of the pipe sections.

After the pipe sections have been inserted in the band 20, if desired an encasement comprising an annular body 23 of concrete or the like is provided encircling the band 20 and in the form of the invention shown in Fig. 1 this encasement is extended beyond the reduced end portions of the respective pipe sections to a point beyond the ends of the band 20. In the modified form of the invention where it is desired to produce a joint which is flush with the outer walls of the pipe sections, the encasement here indicated by reference numeral 23a is entirely included within the region of the reduced end portions of the pipe sections. In this form of the invention the reduced end portions are relatively of less diameter compared to the external diameter of the pipe than in the form of the invention shown in Fig. 1 in order to provide a greater space between the outer surface of the band 20 and the outer surface of the pipe sections.

Although the invention has been particularly shown and described, it is contemplated that certain changes and modifications might be made without departing from the invention and it is intended to cover such changes which come within the scope of the claims.

While I have shown the band 20 as being made of metal and while such material is preferred, it is to be understood that other material may be used such as for instance synthetic resinous plastics.

I claim as my invention:

1. In a pipe joint, a pair of concrete pipe sections adjacently disposed in end to end relation, each of said pipe sections being provided with a shoulder, a reduced end portion on each pipe section, the reduced end portions of each pipe section being provided with an annular groove; a band encircling the reduced end portions of said pipe sections and in abutting relation to the respective shoulders of said pipe sections; and a resilient packing ring in each groove under compression between the respective pipe sections and said band.

2. In a pipe joint, a pair of concrete pipe sections disposed adjacently in end to end relation, said pipe sections each having reduced end portions provided with an annular groove and terminating at their inner ends in an annular abutment shoulder, said reduced end portions being characterized by a particularly smooth and dense quality of concrete in the region of their outer surfaces including the region of said grooves; a metal band encircling adjacent end portions of said pipe sections in abutting relation to the respective abutment shoulders thereof, said band being slightly longer than the combined length of the reduced end portions of said pipe sections and being of a diameter intermediate that of the greatest diameter of the pipe sections and that of the reduced end portions thereof; a resilient packing ring in each groove under compression between the respective pipe sections and said band; said pipe sections and said band cooperating to form an annular recess; and an annular encasement of concrete filling said recess and engaging the outer surface of said band and the respective pipe sections.

FLOYD N. GRANT.